United States Patent
Iwamura et al.

(10) Patent No.: US 8,103,306 B2
(45) Date of Patent: Jan. 24, 2012

(54) MOBILE STATION, BASE STATION AND METHOD OF CONTROLLING PERIPHERAL CELL MEASUREMENT

(75) Inventors: Mikio Iwamura, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 778 days.

(21) Appl. No.: 12/159,179

(22) PCT Filed: Dec. 26, 2006

(86) PCT No.: PCT/JP2006/325976
§ 371 (c)(1),
(2), (4) Date: Sep. 23, 2008

(87) PCT Pub. No.: WO2007/077847
PCT Pub. Date: Jul. 12, 2007

(65) Prior Publication Data
US 2009/0054055 A1    Feb. 26, 2009

(30) Foreign Application Priority Data

Dec. 28, 2005  (JP) ................................. 2005-379988
Mar. 6, 2006   (JP) ................................. 2006-059636

(51) Int. Cl.
    *H04M 1/00*    (2006.01)
(52) U.S. Cl. .................. 455/552.1; 455/423; 455/161.1; 455/167.1; 455/434; 455/436; 455/550.1; 455/67.11
(58) Field of Classification Search .............. 455/161.1, 455/167.1, 434, 552.1, 550.1, 436–444; 370/331
    See application file for complete search history.

(56) References Cited

U.S. PATENT DOCUMENTS

| | | | |
|---|---|---|---|
| 6,049,715 A * | 4/2000 | Willhoff et al. | 455/436 |
| 6,205,334 B1 * | 3/2001 | Dent | 455/434 |
| 6,519,462 B1 * | 2/2003 | Lu et al. | 455/453 |
| 6,760,567 B1 * | 7/2004 | Jeong et al. | 455/67.11 |
| 7,359,355 B2 | 4/2008 | Faerber | |
| 7,392,014 B2 | 6/2008 | Baker et al. | |
| 2003/0031143 A1 | 2/2003 | Faerber | |
| 2005/0277422 A1 | 12/2005 | Baker et al. | |
| 2006/0126577 A1 * | 6/2006 | Yano et al. | 370/337 |

FOREIGN PATENT DOCUMENTS

CN    1397145 A    2/2003
(Continued)

OTHER PUBLICATIONS

Japanese Office Action for Application No. 2006-059636, mailed on Jan. 25, 2011 (5 pages).

(Continued)

*Primary Examiner* — Vladimir Magloire
(74) *Attorney, Agent, or Firm* — Osha • Liang LLP

(57) ABSTRACT

A mobile station includes a radio channel condition measurement portion that measures a radio channel condition, a radio channel averaging portion that averages the measured radio channel condition over a predetermined period of time, and a reception mode control portion that allows switching to a measurement mode for measuring a different frequency and a different system to be realized in accordance with the averaged radio channel condition; and a base station includes a radio channel condition averaging portion that averages a radio channel condition received from a mobile station, over a predetermined period of time, and a transmission mode control portion that allows switching to a discontinuous transmission mode for performing a discontinuous transmission to be realized in accordance with the averaged radio channel condition.

9 Claims, 11 Drawing Sheets

FOREIGN PATENT DOCUMENTS

| | | |
|---|---|---|
| CN | 1666448 A | 9/2005 |
| JP | 2003-060562 A | 2/2003 |
| JP | 2003-527798 | 9/2003 |
| JP | 2005-57710 | 3/2005 |
| JP | 2005-531247 | 10/2005 |
| JP | 2005-354196 A | 12/2005 |
| WO | 2005/122432 A1 | 12/2005 |

OTHER PUBLICATIONS

Patent Abstracts of Japan for Japanese Publication No. 2003-060562, publication date Feb. 28, 2003 (1 page).

Patent Abstracts of Japan for Japanese Publication No. 2005-354196, publication date Dec. 22, 2005 (1 page).

Taiwanese Office Action for Application No. 095149183, mailed on Jan. 28, 2011 (13 pages).

3GPP_TS25.331 V6.8.0; "Protocol Specification"; Dec. 22, 2005 (1174 pages).

3GPP TS25.214 V.6.7.1; "Physical Layer Procedures (FDD)"; Dec. 15, 2005 (60 pages).

3GPP TS25.308 V.6.3.0; "Overall Description"; Dec. 2004 (28 pages).

3GPP TR25.858 V5.0.0; "Physical Layer Aspects"; Mar. 2002 (31 pages).

3GPP TR.25.813, V0.1.0; "Radio Interface Protocol Aspects"; Nov. 2005 (19 pages).

3GPP TR25.814, V1.0.1; "Physical Layer Aspects for Evolved UTRA"; Nov. 2005 (72 pages).

International Search Report w/translation from PCT/JP2006/325976 dated Mar. 13, 2007 (5 pages).

Written Opinion from PCT/JP2006/325976 dated Mar. 13, 2007 (4 pages).

Chinese Office Action for Application No. 200680053432.2, mailed on Jul. 22, 2011 (20 pages).

* cited by examiner

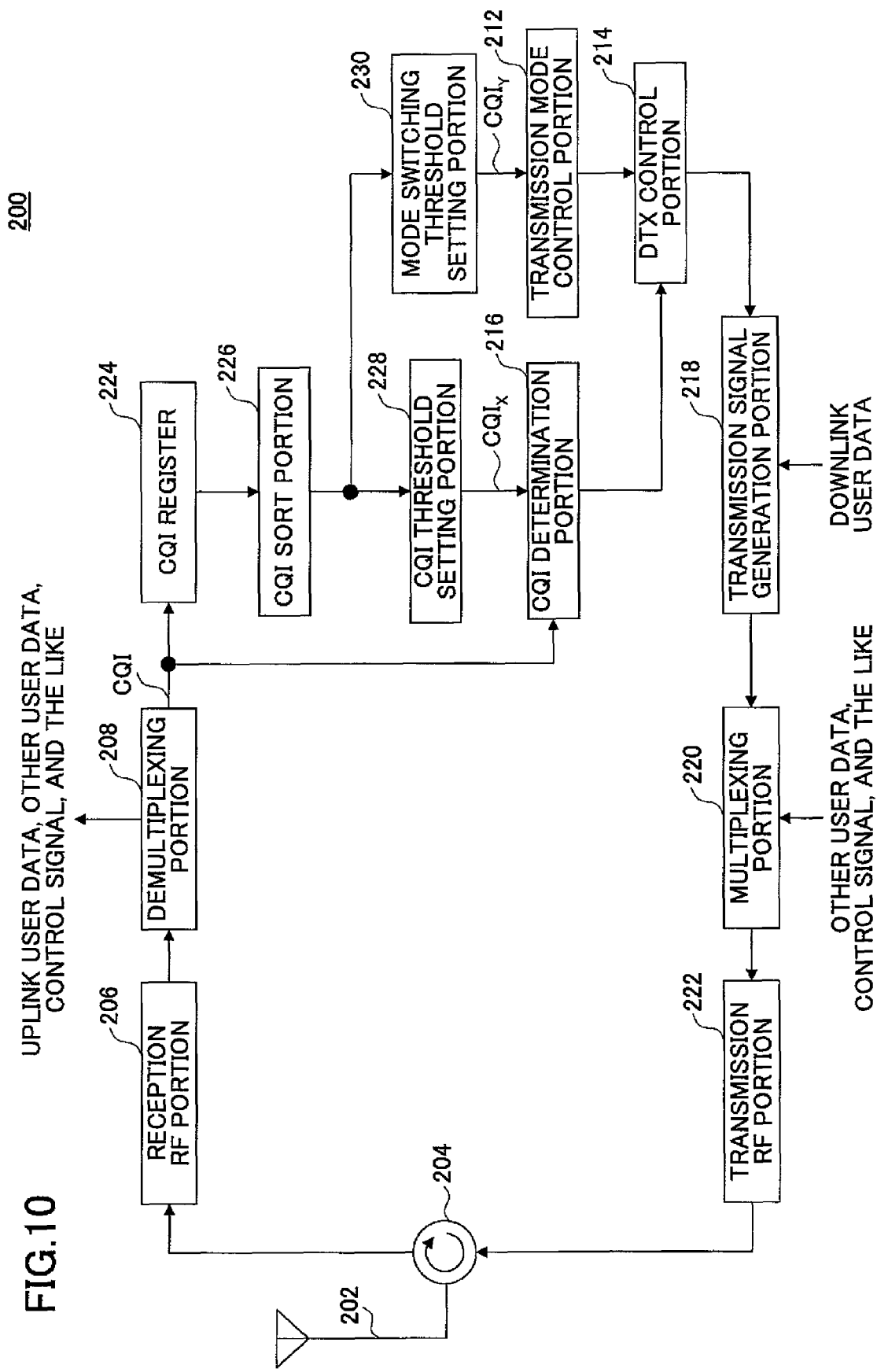

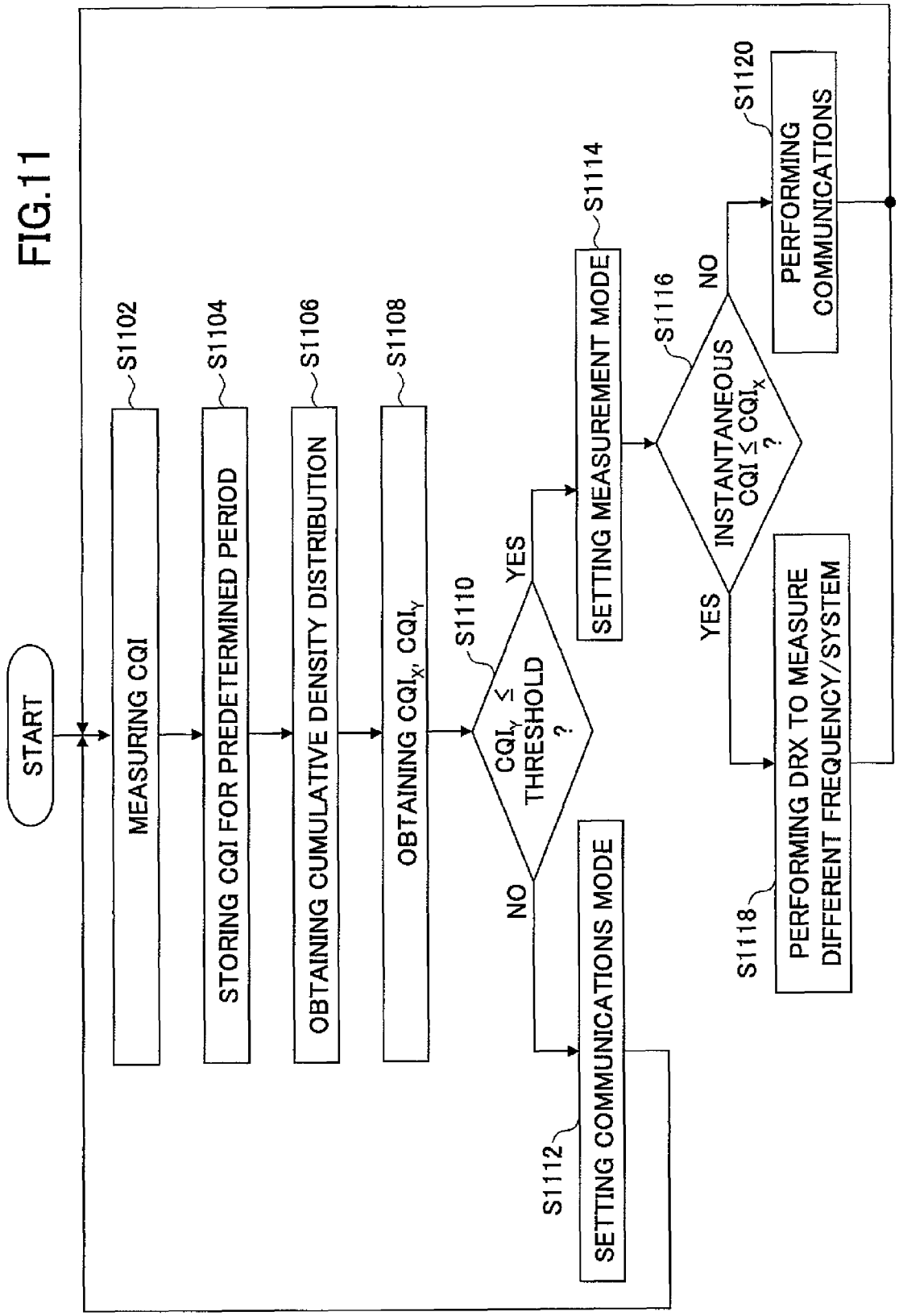

MOBILE STATION, BASE STATION AND METHOD OF CONTROLLING PERIPHERAL CELL MEASUREMENT

TECHNICAL FIELD

The present invention relates to a mobile station, a base station, and a method of controlling peripheral cell measurement.

BACKGROUND ART

In a cellular system, handover control is carried out to appropriately switch cells (base stations) to which a user is connected along with movement of the user. In the handover control, propagation conditions in peripheral cells are measured by a mobile station, and the handover is carried out in accordance with the measurement result, in order to realize the handover to an appropriate adjacent cell.

In this case, the peripheral cells and the cell to which the mobile station is currently connected may operate on different frequencies, or on plural frequencies. When the handover is to be carried out to a cell using different frequencies, the mobile station needs to measure the propagation conditions in different frequencies in the peripheral cells and the current cell.

In addition, a handover to a peripheral cell that employs a different radio transmission method (different system) may be advantageous in terms of a traffic amount and propagation conditions. In this situation, the mobile station needs to measure different frequencies and systems during communications.

It should be noted here that a mobile station that has only one receiver cannot concurrently measure plural frequencies and systems.

This is because an REF (Radio Frequency) circuit of the receiver cannot be concurrently attuned to plural frequency carriers or systems. For plural frequencies or systems to be concurrently measured, the mobile station has to include plural receivers (RF circuits), which increases the size, energy consumption, and price of the mobile station.

Therefore, the mobile stations currently widely used have only one receiver. When such mobile stations measure the different frequencies and the different systems, the currently-conducted communications are switched to Discontinuous Reception (DRX), and a gap period caused during the DRX is used for the measurement. In this case, unless the base station recognizes the gap period of the DRX, the base station may transmit data during the gap time when the mobile station is carrying out the measurement. Such transmission of the data may not only lead to a waste of precious radio resources but also cause adverse effects such as increased interference power in other communications and lengthened delay. In order to avoid such transmissions, the base station has to recognize the DRX status of the mobile station.

In a radio communications system such as HSDPA, the mobile station frequently notifies the base station of radio channel conditions (referred to as Channel Quality Indicator (CQI)) in order to carry out link adaptation that tracks fast fading, for example, Transmission Power Control and Adaptive Modulation and Coding (AMC). For example, the mobile station measures the chip energy to total received power (Ec/Io) of a common pilot channel transmitted by the base station, and sends a value obtained by quantizing the Ec/Io into 32 levels as the CQI in a time cycle of 2 ms (or 2× integer ms), in HSDPA.

SUMMARY OF INVENTION

Problem to be Solved by the Invention

However, there are the following issues about the above related art.

In the above radio communications system, the DRX control is carried out by a radio protocol, for example, Radio Resource Control (RRC) protocol in W-CDMA.

Such control is disadvantageous in that the radio resources are wasted and communications capacity, which is essentially prioritized, may be reduced.

In addition, when a control command is logically mistaken, the base station and the mobile station may malfunction.

The present invention has been made in view of the above, and is directed to a mobile station, a base station, and a method of controlling peripheral cell measurement that are capable of carrying out discontinuous reception/discontinuous transmission while reducing radio resource consumption.

Means for Solving the Problem

In order to eliminate the above disadvantages, a first aspect of the present invention provides a mobile station including a radio channel condition measurement portion that measures a radio channel condition; a radio channel averaging portion that averages the measured radio channel condition over a predetermined period of time; and a reception mode control portion that allows switching to a measurement mode for measuring a different frequency and a different system to be realized in accordance with the averaged radio channel condition.

With such a configuration, the switching to the measurement mode where the different frequency and the different system are measured is autonomously realized in accordance with the averaged radio channel condition.

A second aspect of the present invention provides a base station including a radio channel condition averaging portion that averages a radio channel condition received from a mobile station, over a predetermined period of time; and a transmission mode control portion that allows switching to a discontinuous transmission mode for performing a discontinuous transmission to be realized in accordance with the averaged radio channel condition.

With such a configuration, the switching to the discontinuous transmission mode for performing the discontinuous transmission is autonomously realized in accordance with the averaged radio channel condition.

A third aspect of the present invention provides a peripheral cell measurement method including a reception step in which a common pilot channel transmitted from a base station covering a cell where a mobile station exists is received; a radio channel condition measurement step in which a radio channel condition is measured from the common pilot channel; a radio channel condition averaging step in which the measured radio channel condition is averaged over a predetermined period of time; and a reception mode control step in which switching to a measurement mode for measuring a different frequency and a different system is realized in accordance with the averaged radio channel condition.

With this, the switching to the measurement mode where the different frequency and the different system are measured is autonomously realized in accordance with the averaged radio channel condition.

A fourth aspect of the present invention provides a mobile station including a radio channel condition measurement portion that measures a radio channel condition; a sort portion that obtains a cumulative density distribution of the measured radio channel condition; a statistical amount calculation portion that calculates a percent value in accordance with the cumulative density distribution; and a reception mode control portion that allows switching to a measurement mode for measuring a different frequency and a different system to be realized in accordance with the percent value.

With such a configuration, the switching to the measurement mode where the different frequency and the different system are measured is autonomously realized in accordance with the statistical value obtained from the cumulative density distribution of the radio channel condition.

A fifth aspect of the present invention provides a base station including a sort portion that obtains a cumulative density distribution of a radio channel condition received from a mobile station; a statistical amount calculation portion that calculates a percent value in accordance with the cumulative density distribution; and a transmission mode control portion that allows switching to a discontinuous transmission mode for performing discontinuous transmission to be realized in accordance with the percent value.

With such a configuration, the switching to the discontinuous transmission mode where the discontinuous transmission is carried out is autonomously realized in accordance with the statistical amount obtained from the cumulative density distribution of the radio channel condition.

A sixth aspect of the present invention provides a peripheral cell measurement method including a reception step in which a common pilot channel transmitted from a base station covering a cell where a mobile station exists is received; a radio channel condition measurement step in which a radio channel condition is measured from the common pilot channel; a sort step in which a cumulative density distribution of the measured channel condition is obtained; a statistical amount calculation step in which a percent value is calculated in accordance with the cumulative density distribution; and a reception mode control step in which switching to a measurement mode for measuring a different frequency and a different system is realized in accordance with the percent value.

With this, the switching to the measurement mode where the different frequency and the different system are measured is autonomously realized in accordance with the statistical amount obtained from the cumulative density distribution of the radio channel condition.

Advantage of the Invention

According to an example of the present invention, a mobile station, a base station, and a peripheral cell measurement method are realized that are capable of controlling the discontinuous reception/discontinuous transmission while radio resource consumption is reduced.

BRIEF DESCRIPTION OF THE DRAWINGS

FIG. 10 a partial block diagram illustrating a base station according to an example of the present invention; and FIG. 11 is a flowchart illustrating the mobile station according to the example of the present invention.

LIST OF REFERENCE SYMBOLS

100: mobile station
200: base station

BEST MODE FOR CARRYING OUT THE INVENTION

Next, examples according to the present invention are described referring to the accompanying drawings. In all the drawings for explaining the examples, the same reference marks are given to elements having the same functions, and repeated explanations are omitted.

A radio communications system according to this example of the present invention includes a base station and a mobile station.

Figure 1:
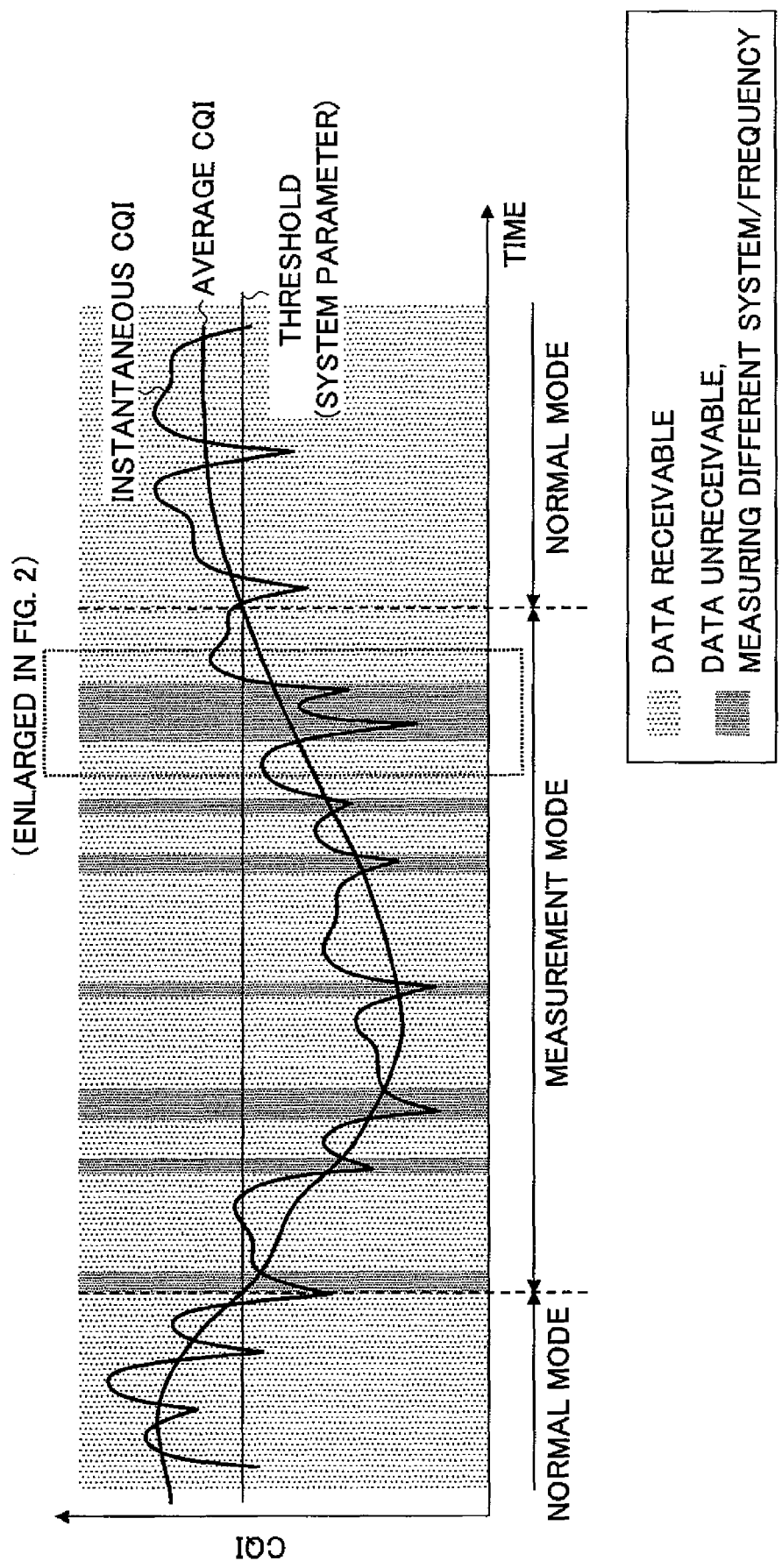
FIG. 1 is an explanatory view illustrating operations of a radio communications system according to an example of the present invention.

In the radio communications system according to this example of the present invention, the mobile station measures a radio channel condition so as to average the measured radio channel condition over a predetermined period. In the radio communications system, when the average value of the CQI (average CQI) is less than a threshold (a system parameter) as shown in FIG. 1, a mode of measuring different frequencies and different systems (referred to as a measurement mode) comes into operation, and when the average CQI exceeds the threshold, a normal mode is restored.

During the measurement mode, the mobile station compares an instantaneous value of the CQI with the average CQI, and carries out the DRX so as to autonomously measure the different frequencies and the different systems in a time period when the instantaneous CQI is less than the average CQI. In addition, the mobile station does not carry out the DRX, and allows a receiver to be attuned to the system and the frequency used for the current communications in a time period when the instantaneous CQI exceeds the average CQI.

Figure 2:
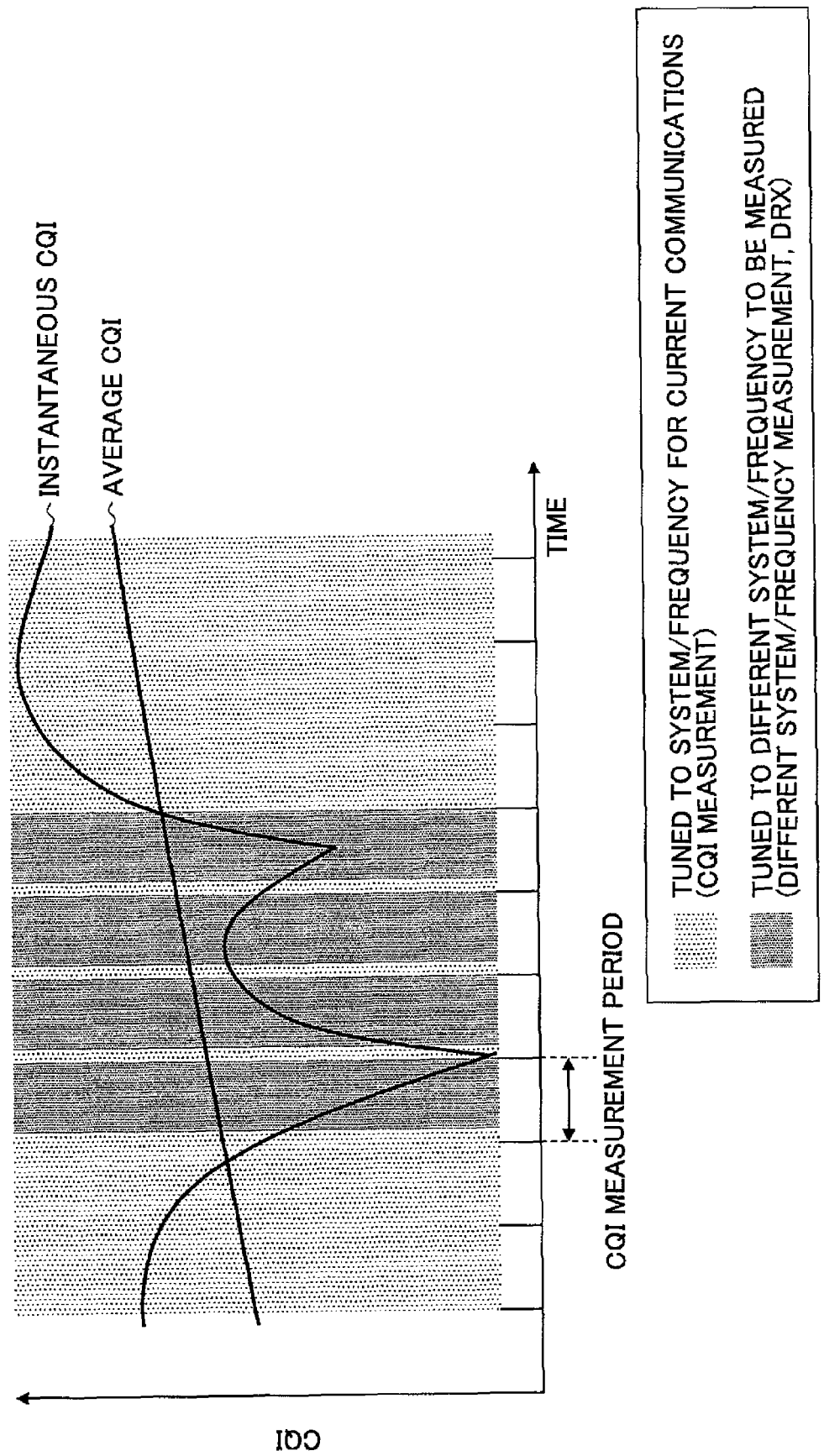
FIG. 2 is another explanatory view illustrating the operations of the radio communications system according to the example of the present invention.

For example, during the measurement mode, the mobile station carries out the DRX and measures the different frequency and the different system when the instantaneous CQI is below the average CQI as shown in FIG. 2. This means that the receiver is attuned to the different frequency and the different system. Once the receiver is attuned to the different frequency and the different system, the CQI cannot be measured. Therefore, the receiver has to be periodically attuned to the frequency and the system used for the current communications. For example, the system and the frequency to be attuned to are controlled in a predetermined short period of time, as shown in FIG. 2.

The threshold at which switching from the normal mode to the measurement mode takes place is the same as the threshold at which switching from the measurement mode to the normal mode takes place in the above explanation. However, the threshold at which switching from the measurement mode to the normal mode takes place may have hysteresis so as to be different.

Figure 3:
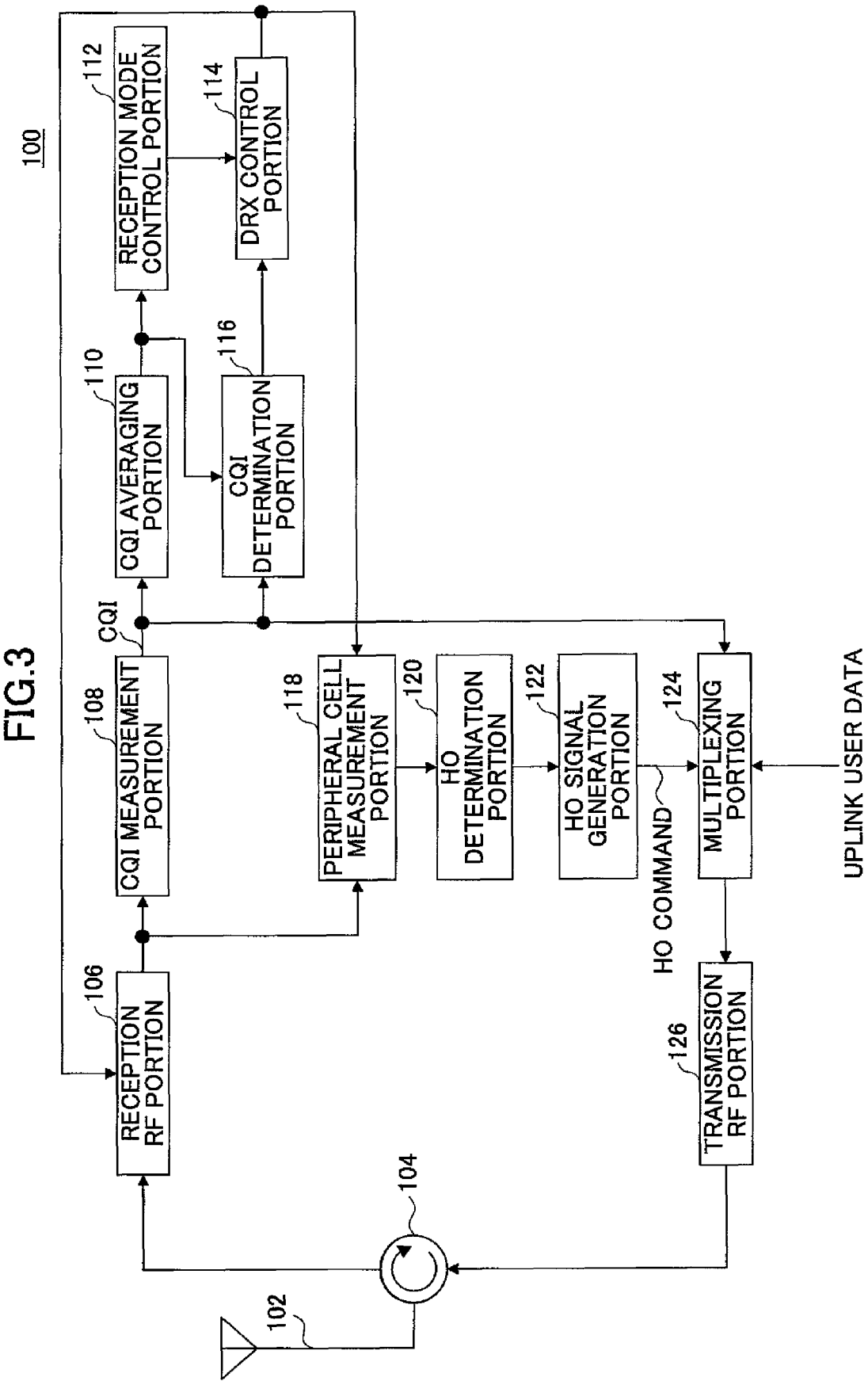
FIG. 3 is a partial block diagram illustrating a mobile station according to an example of the present invention.

Next, a mobile station 100 according to this example of the present invention is described in reference to FIG. 3.

The mobile station 100 according to this example can be attuned to plural systems. The mobile station calculates a value (average CQI below) obtained by averaging the CQI over a certain period of time, for example, a period of time when shadowing can be tracked, for example, a few seconds, carries out the DRX in a time period when the instantaneous CQI is less than the average CQI, and carries out a peripheral cell measurement for the different frequency and the different system.

The mobile station 100 includes an antenna 102, an transmission/reception shared portion 104 connected to the antenna 102, a reception RF portion 106 to which a reception signal from the transmission/reception shared portion 104 is input, a peripheral cell measurement portion 118 to which an output signal from the reception RF portion 106 is input, a CQI measurement portion 108 that the output signal from the reception RF portion 106 is input to and serves as a radio channel condition measurement portion, a CQI averaging portion 110 that CQI information output from the CQI measurement portion 108 is input to and serves as a radio channel condition averaging portion, a CQI determination portion 116 to which the CQI information output from the CQI measurement portion 108 is input, a multiplexing portion 124 to which the CQI information output from the CQI measurement portion 108 is input, a reception mode control portion 112 that an output signal from the CQI averaging portion 110 is input to and serves as a reception mode control portion, a DRX control portion 114 that output signals from the reception mode control portion 112 and the CQI determination portion 116 are input to and serves as a discontinuous reception control portion, a handover (HO) determination portion 120 to which an output signal from the peripheral cell measurement portion 118 is input, a HO signal generation portion 122 to which an output signal from the HO determination portion 120 is input, and a transmission RF portion 126 to which an output signal from the multiplexing portion 124 is input.

The output signal from the CQI averaging portion 110 is input to the CQI determination portion 116. In addition, an output signal from the DRX control portion 114 is input to the reception RF portion 106 and the peripheral cell measurement portion 118. Moreover, a HO command output from the HO signal generation portion 122 is input to the multiplexing portion 124, and an output signal from the transmission RF portion 126 is input to the transmission/reception shared portion 104.

The reception RF portion 106 is attuned to the system and frequency so as to receive a signal and outputs the received data to the CQI measurement portion 108 and the peripheral measurement portion 118. For example, the reception RF portion 106 is attuned to the frequency and the radio method (system) used for the current communications in the normal mode. In addition, for example, the reception RF portion 106 is attuned to the frequency and the system in a peripheral cell during the DRX of the measurement mode.

However, even when the DRX is carried out, the reception RF portion 106 is attuned to the frequency and the system used in the current communications at the time of measuring the CQI, for example, at the time of receiving the common pilot channel of the cell where the communications are carried out, as described in reference to FIG. 2.

The CQI measurement portion 108 measures the reception signal in the cell where the current communications are carried out, for example, the radio channel condition (CQI) from the common pilot channel, and outputs information indicating the instantaneous value of the CQI to the CQI averaging portion 110, the CQI determination portion 116, and the multiplexing portion 124.

The CQI averaging portion 110 averages the CQI, and outputs information indicating the average CQI to the reception mode control portion 112 and the CQI determination portion 116. For example, the CQI averaging portion 110 smoothes the fast fading and averages the CQI to a degree that allows for tracking the shadowing.

The CQI determination portion 116 compares the instantaneous value of the CQI with the average CQI and outputs the result to the DRX control portion 114.

The reception mode control portion 112 compares the average CQI with a threshold and controls the reception mode. In other words, the reception mode control portion 112 controls switching the measurement mode/normal mode in accordance with the average CQI. In addition, the reception mode control portion 112 outputs information indicating the reception mode to the DRX control portion 114.

The DRX control portion 114 controls the frequency and system of the reception REF portion 106 in accordance with the comparison result input from the CQI determination portion 116, when the information indicating the measurement mode is input from the reception mode control portion 112. For example, the DRX control portion 114 controls the RF portion 106 so that the RF portion 106 is attuned to the currently used frequency and system, when the information indicating that the instantaneous value of the CQI is greater than the average CQI is input. In addition, the DRX control portion 114 controls the RF portion 106 so that the RF portion 106 is attuned to a different frequency and system to be measured, for example, the frequency and system of a peripheral cell, when the information indicating that the instantaneous value of the CQI is less than the average CQI is input.

In addition, the DRX control portion 114 controls starting and stopping the measurement of the peripheral cell by the peripheral cell measurement portion 118.

The DRX control portion 114 makes a pause when the information indicating the normal mode is input from the reception mode control portion 112.

The peripheral cell measurement portion 118 measures the propagation conditions of the peripheral cell, such as the different frequency and the different system, during the DRX, under control of the DRX control portion 114 in the case of the measurement mode. For example, the peripheral cell measurement portion 118 measures the propagation conditions of the peripheral cell in accordance with the reception data input from the reception RF portion 106, and outputs information indicating the propagation conditions to the HO determination portion 120. The peripheral cell measurement portion 118 makes a pause in the case of the normal mode.

The HO determination portion 120 determines the necessity of handover (HO) in accordance with the propagation conditions in the peripheral cell that has been measured by the peripheral cell measurement portion 118 in the case of the measurement mode, and outputs the determination result to the HO signal generation portion 122. The HO determination portion 120 makes a pause in the case of the normal mode.

The HO signal generation portion 122 generates a control command in order to carry out the HO when it is determined by the HO determination portion 120 that the HO is necessary, and outputs the HO command to the multiplexing portion 124. The HO signal generation portion 122 makes a pause in the case of the normal mode.

The multiplexing portion 124 multiplexes the reported value of the CQI (the instantaneous CQI), a HO control signal and uplink user data, and outputs the multiplexed signal to the transmission REF portion 126.

The transmission RF portion 126 converts the transmission signal to an RF signal and excites the antenna. As a result, the data are transmitted.

Figure 4:
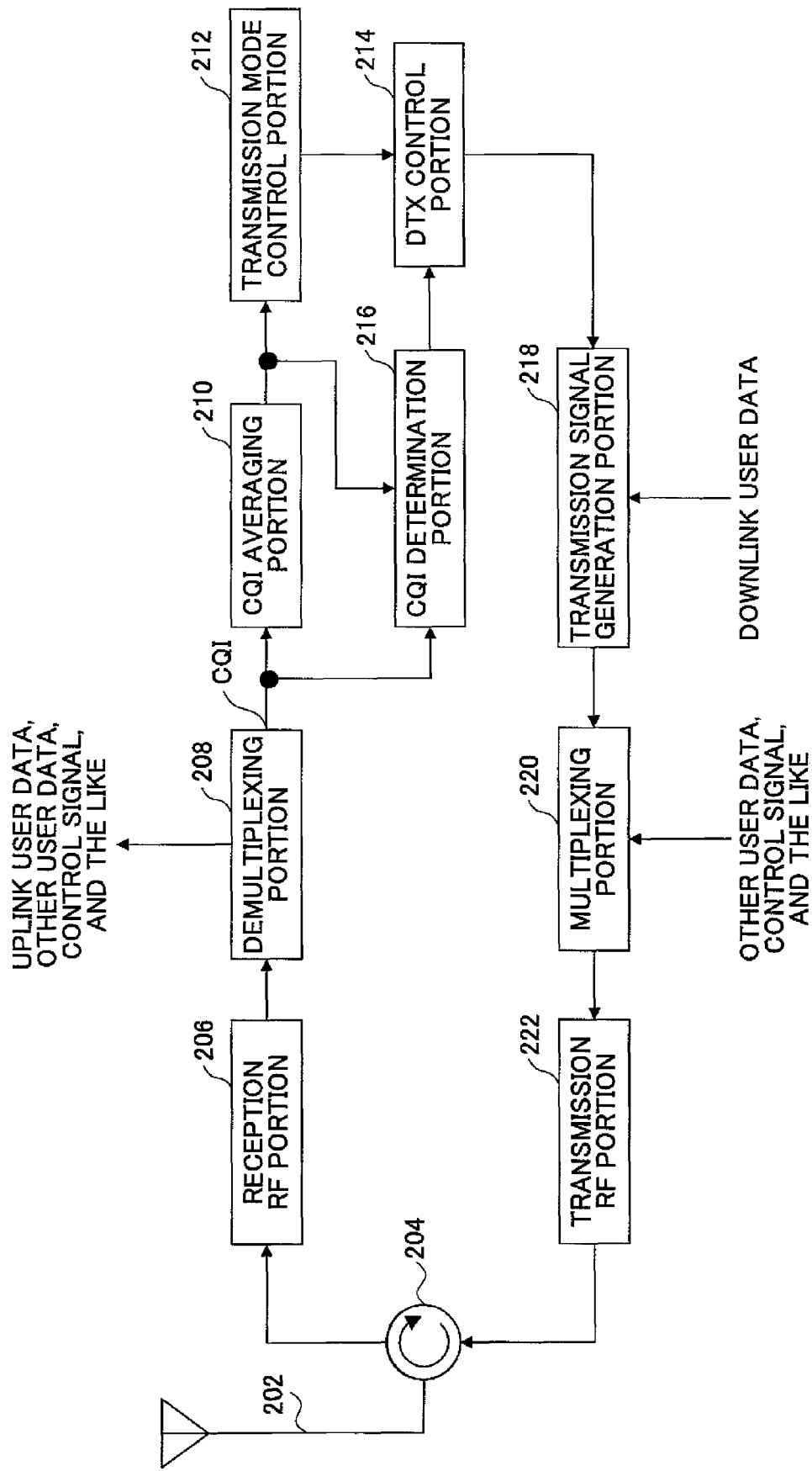
FIG. 4 is a partial block diagram illustrating a base station according to an example of the present invention.

Next, a base station according to an example of the present invention is described in reference to FIG. 4.

A base station 200 according to this example has two transmission modes, which are the normal mode and the discontinuous transmission mode, in response to the above-mentioned reception modes. The discontinuous transmission mode corresponds to the measurement mode in the mobile station 100.

The base station 200 averages the radio channel conditions (CQI) sent from the mobile station 100 in the same algorithm employed in the mobile station 100, and switches to the discontinuous transmission mode in accordance with the average value of the CQI. In other words, the base station 200 carries out the DRX/DTX control when the average CQI is less than a certain threshold, and ends the DRX/DTX control when the average CQI exceeds the threshold so as to switch back to the normal mode.

In addition, during the discontinuous transmission mode, the base station 200 determines that the mobile station carries out the DRX when the input instantaneous CQI is less than the average value of the CQI, and ends transmitting the downlink signal to the mobile station. In other words, the base station 200 carries out the discontinuous transmission (DTX).

The base station 200 according to this example includes an antenna 202, a transmission/reception shared portion 204 connected to the antenna 202, a reception RF portion 206 to which a reception signal from the transmission/reception shared portion 204 is input, a demultiplexing portion 208 to which an output signal from the reception RF portion 206 is input, a CQI determination portion 216 to which CQI information from the demultiplexing portion 208 is input, a CQI averaging portion 210 that the CQI information from the demultiplexing portion 208 is input to and serves as a radio channel condition averaging portion, a transmission mode control portion 212 that an output signal from the CQI averaging portion 210 is input to and serves as a transmission mode control portion, a DTX control portion 214 that output signals from the transmission mode control portion 212 and the CQI determination portion 216 are input to and serves as a discontinuous transmission control portion, a transmission signal generation portion 218 to which an output signal from the DTX control portion 214 is input, a multiplexing portion 220 to which an output signal from the transmission signal generation portion 218 is input, and a transmission RF portion 222 to which an output signal from the multiplexing portion 220 is input.

The output signal from the CQI averaging portion 210 is also input to the CQI determination portion 216. Additionally, an output signal from the transmission RE portion 222 is input to the transmission/reception shared portion 204.

The reception RF portion 206 is attuned to an uplink signal from the mobile station 100 so as to receive the signal, and outputs the received data to the demultiplexing portion 208. The received data contain, for example, the CQI information, the uplink user data, other user data, a control signal, and the like.

The demultiplexing portion 208 retrieves the CQI information from the received data, and outputs the CQI information to the CQI averaging portion 210 and the CQI determination portion 216.

The CQI averaging portion 210 performs an averaging process on the CQI by the averaging method employed by the averaging portion 110 of the mobile station 100, and outputs information indicating the averaged CQI (average CQI) to the transmission mode control portion 212 and the CQI determination portion 216.

The CQI determination portion 216 compares the CQI input from the demultiplexing portion 208 (the instantaneous CQI) with the CQI input from the CQI averaging portion 210 (the average CQI), and outputs the result to the DTX control portion 214.

The transmission mode control portion 212 compares the average CQI input from the CQI averaging portion 210 with a predetermined threshold, and controls the transmission mode. For example, the transmission mode control portion 212 controls switching the normal mode/discontinuous transmission mode in accordance with the comparison result of the average CQI and the predetermined threshold. In addition, the transmission mode control portion 212 outputs information indicating the transmission mode to the DTX control portion 214.

The DTX control portion 214 controls the data transmission in accordance with the comparison result input from the CQI determination portion 216, when the Information indicating the transmission mode, which is input from the transmission mode control portion 212, indicates the discontinuous transmission mode. For example, the DTX control portion 214 determines that the mobile station 100 is carrying out the DRX when the instantaneous CQI is less than the average CQI in the case of the discontinuous transmission mode, and carries out the DTX control so as to stop the downlink signal transmission to the mobile station 100 concerned. In addition, the DTX control portion 214 carries out control to continue communications when the instantaneous CQI is greater than the average CQI in the case of discontinuous transmission mode. The DTX control portion 214 outputs information indicating the DTX controlling status to the transmission signal generation portion 218.

The transmission signal generation portion 218 generates a downlink user signal which is subjected to the control, and outputs the generated signal to the multiplexing portion 220.

The multiplexing portion 220 multiplexes the downlink signal with other downlink signals and control signals to be transmitted, and outputs the multiplexed signal to the transmission RF portion 222.

The transmission RF portion 222 converts the input signal into an RF signal, and excites the antenna. As a result, the data are transmitted.

Figure 5:
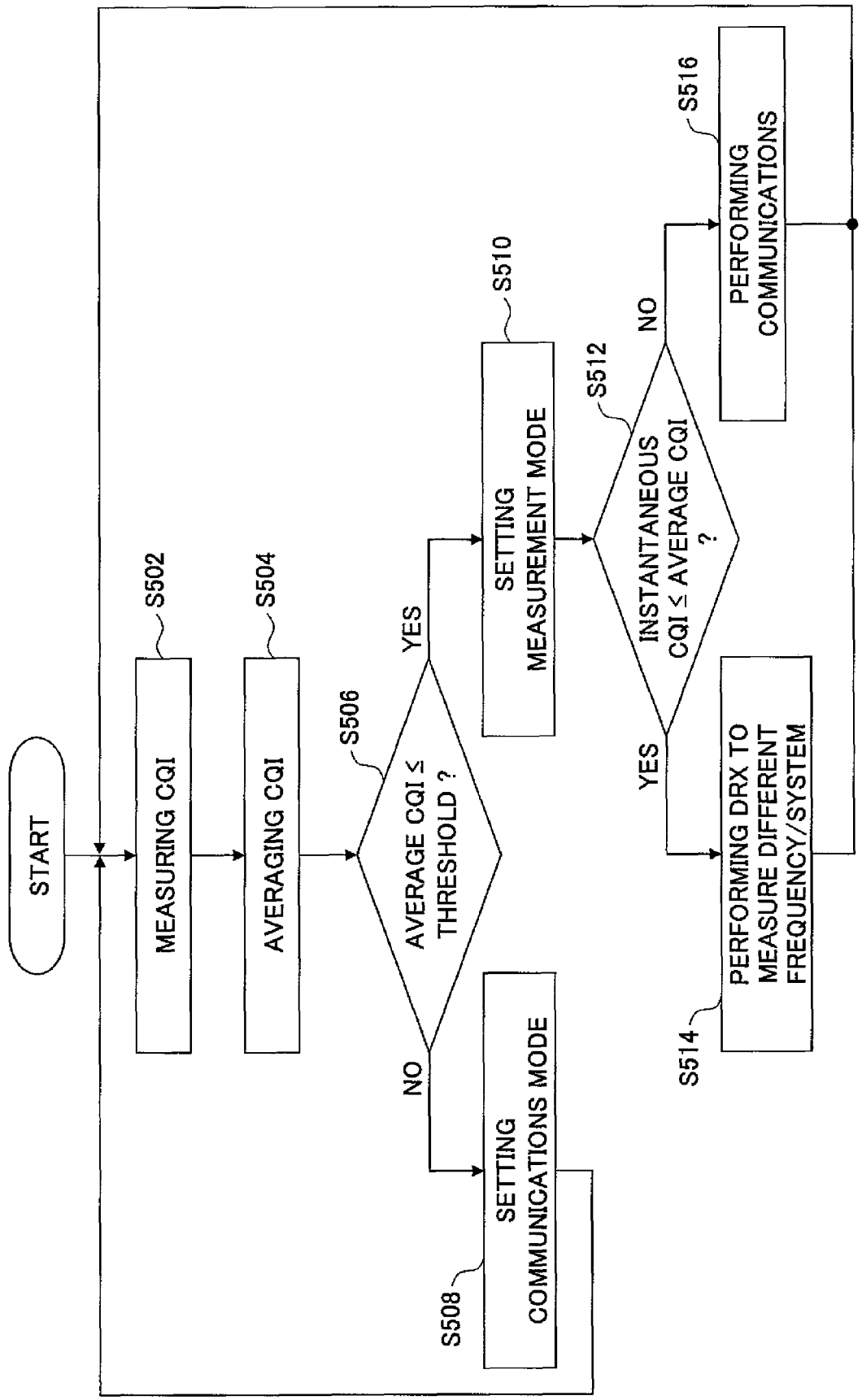
FIG. 5 is a flowchart illustrating operations of the mobile station according to the example of the present invention.
Figure 6:
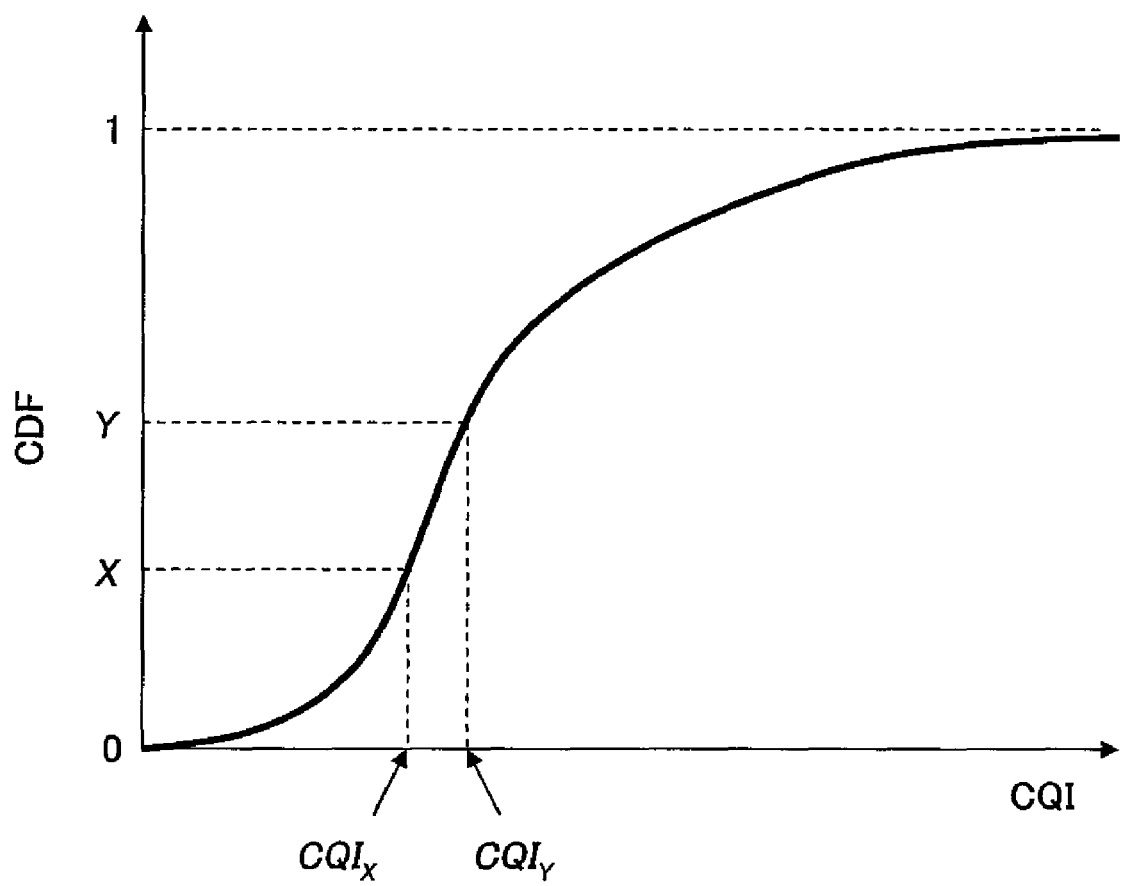
FIG. 6 is an explanatory view illustrating a cumulative density distribution of CQI.

Next, operations of the mobile station 100 according to this example are described in reference to FIG. 5.

The CQI measurement portion 108 measures a reception signal in a cell where communications are carried out, for example, a radio channel condition (CQI) from a common pilot channel (step S502).

Next, the CQI averaging portion 110 averages the CQI (step S504).

Then, the reception mode control portion 112 compares the average CQI with a threshold (step S506).

When the average CQI is not less than or equal to the threshold, namely, the average CQI≦the threshold is not the case (step S506: NO), the reception mode control portion 112 sets the transmission mode (step S508), and the procedure returns to step S502.

On the other hand, in the case of the average CQI≦the threshold (step S506: YES), the reception mode control portion 112 sets the measurement mode (step S510).

Next, the CQI determination portion 116 compares the instantaneous value of the CQI (the instantaneous CQI) with the average value (the average CQI) (step S512).

When the instantaneous CQI is less than or equal to the average CQI, namely, in the case of the instantaneous CQI≦the average CQI (step S512: YES), the DRX control portion 114 carries out the DRX and carries out control so that a different frequency and a different system are measured (step S514). Then, the procedure returns to step S502.

On the other hand, when the instantaneous CQI≦the average CQI is not the case (step S512: NO), the DRX control portion 114 carries out control to continue the communications (step S516). Then, the procedure returns to step S502.

Under ideal operations, switching the normal mode/measurement mode and the timings of the DRX and the DTX during the measurement mode are completely synchronized in the mobile station 100 and the base station 200.

According to the radio communications system of this example, the DRX/DTX is autonomously controlled without carrying out control due to a radio protocol such as RRC. Therefore, waste of radio resources that has been conventionally inevitable because of the radio protocol signal in the DRX/DTX control can be avoided.

Next, a radio communications system according to another example of the present invention is described.

The radio communications system according to this example has the same configurations as the above-mentioned radio communications system, and repeated description is omitted.

Basic operations of the radio communications system according to this example is not different from the operations of the radio communications system described above. For example, the radio communications system according to this example carries out switching the measurement mode/normal mode and controlling the DTX/DRX during the measurement mode.

The radio communications system according to this example is different from the radio communications system described above in that a value to be used in determining the measurement mode/normal mode is a statistical value obtained from a cumulative density distribution of the CQI rather than the average value of the CQI.

In the radio communications system according to this example, the mobile station acquires the cumulative density distribution (the cumulative distribution function (CDF)) of the measured CQI.

The mobile station obtains a predetermined CQI percent value, for example, an X percent value as a second statistical value and a Y percent value as a first statistic value (referred to as $CQI_X$, $CQI_Y$, respectively). The mobile station carries out switching the measurement mode/normal mode in accordance with the $CQI_Y$, and the DTX/DRX control during the measurement mode in accordance with the $CQI_X$. Here, the magnitude relationship of X and Y is arbitrary.

Figure 7:
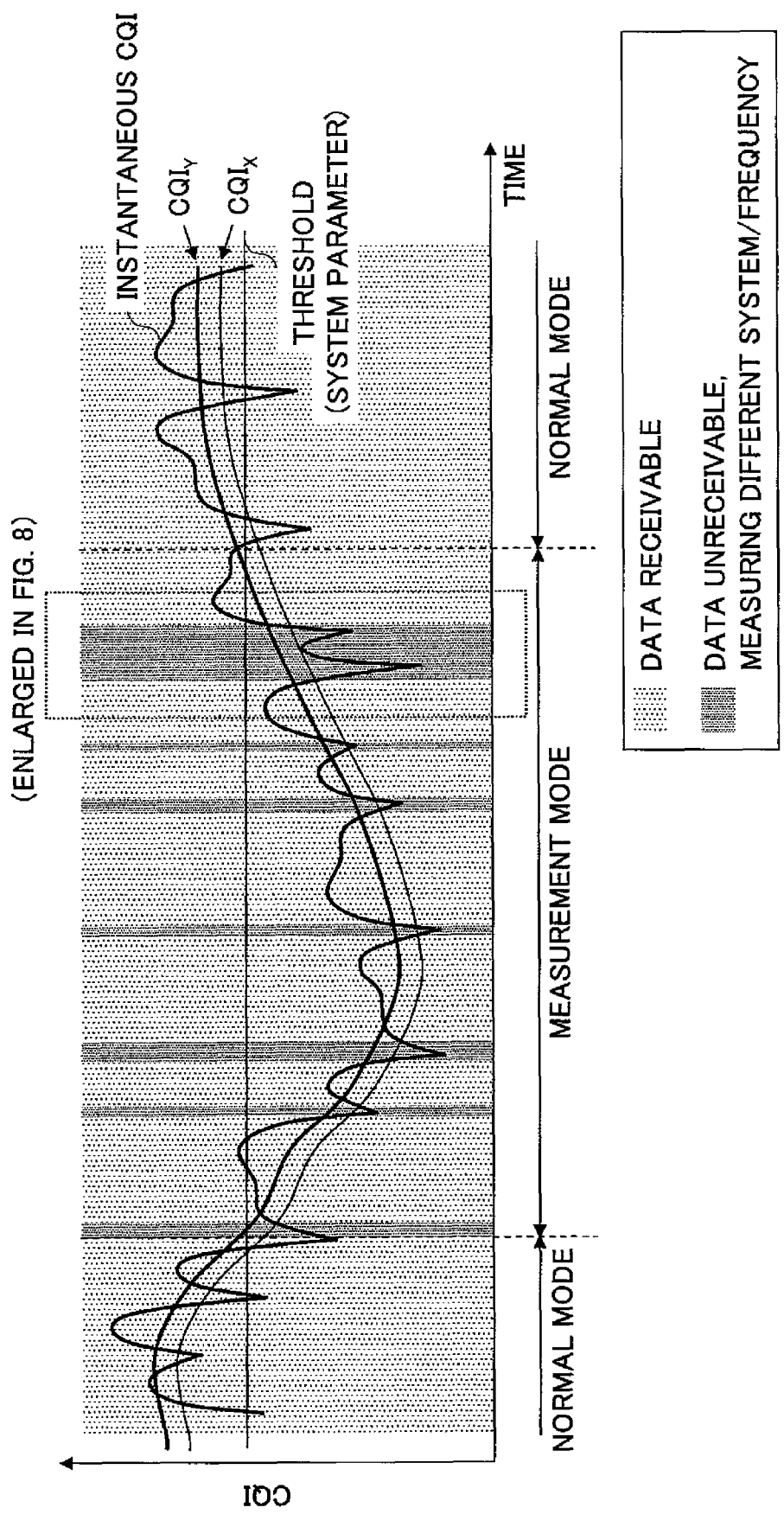
FIG. 7 is an explanatory view illustrating operations of a radio communications system according to an example of the present invention.

For example, the mobile communications system according to this example switches to the measurement mode that measures a different frequency and a different system when the $CQI_Y$ is less than a certain threshold (a system parameter) as shown in FIG. 7 and returns to the normal mode when the $CQI_Y$ exceeds the threshold.

During the measurement mode, the mobile station compares the instantaneous value of the CQI (the instantaneous CQI) with the $CQI_X$ and carries out the DRX so as to autonomously measure a different frequency and a different system in a time period when the instantaneous CQI is less than the $CQI_X$. In addition, during the measurement mode, the mobile station does not carry out the DRX but enables the receiver to be attuned to the frequency and system used for the current communications in a time period when the instantaneous CQI exceeds the $CQI_X$, so that the mobile station can receive data.

Figure 8:
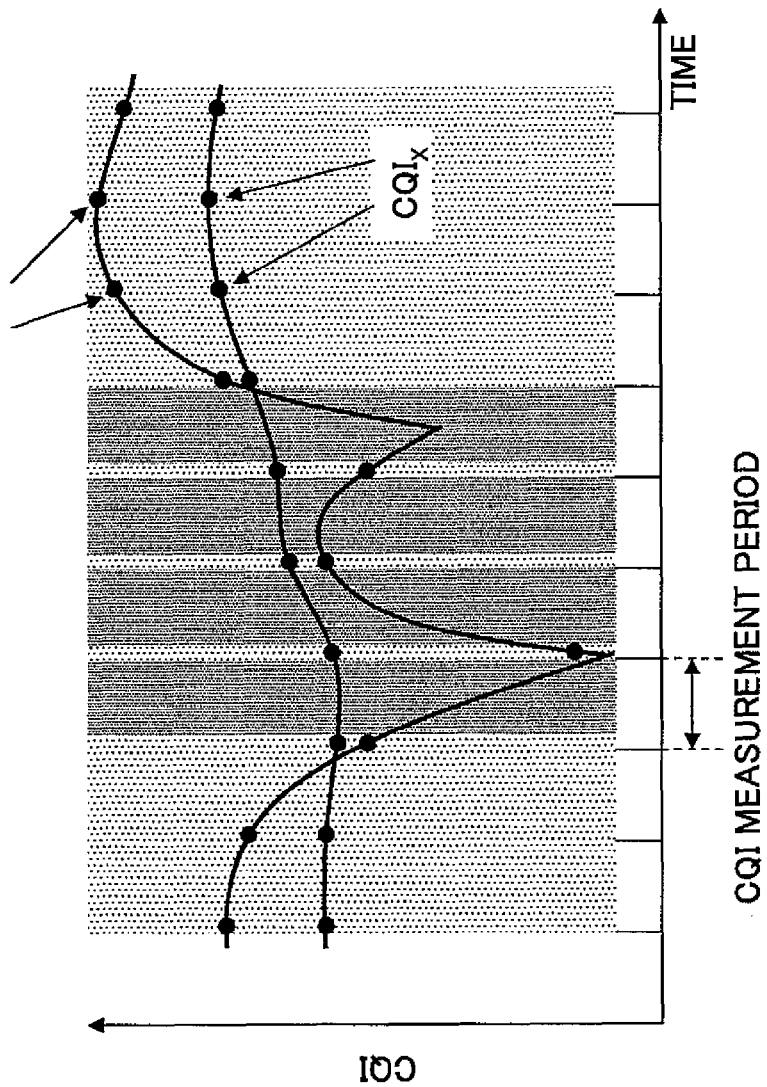
FIG. 8 is another explanatory view illustrating operation of the radio communications system according to the example of the present invention.

For example, the mobile station carries out the DRX so as to measure a different frequency and a different system when the instantaneous CQI is less than the $CQI_X$ during the measurement mode, as shown in FIG. 8.

Figure 9:
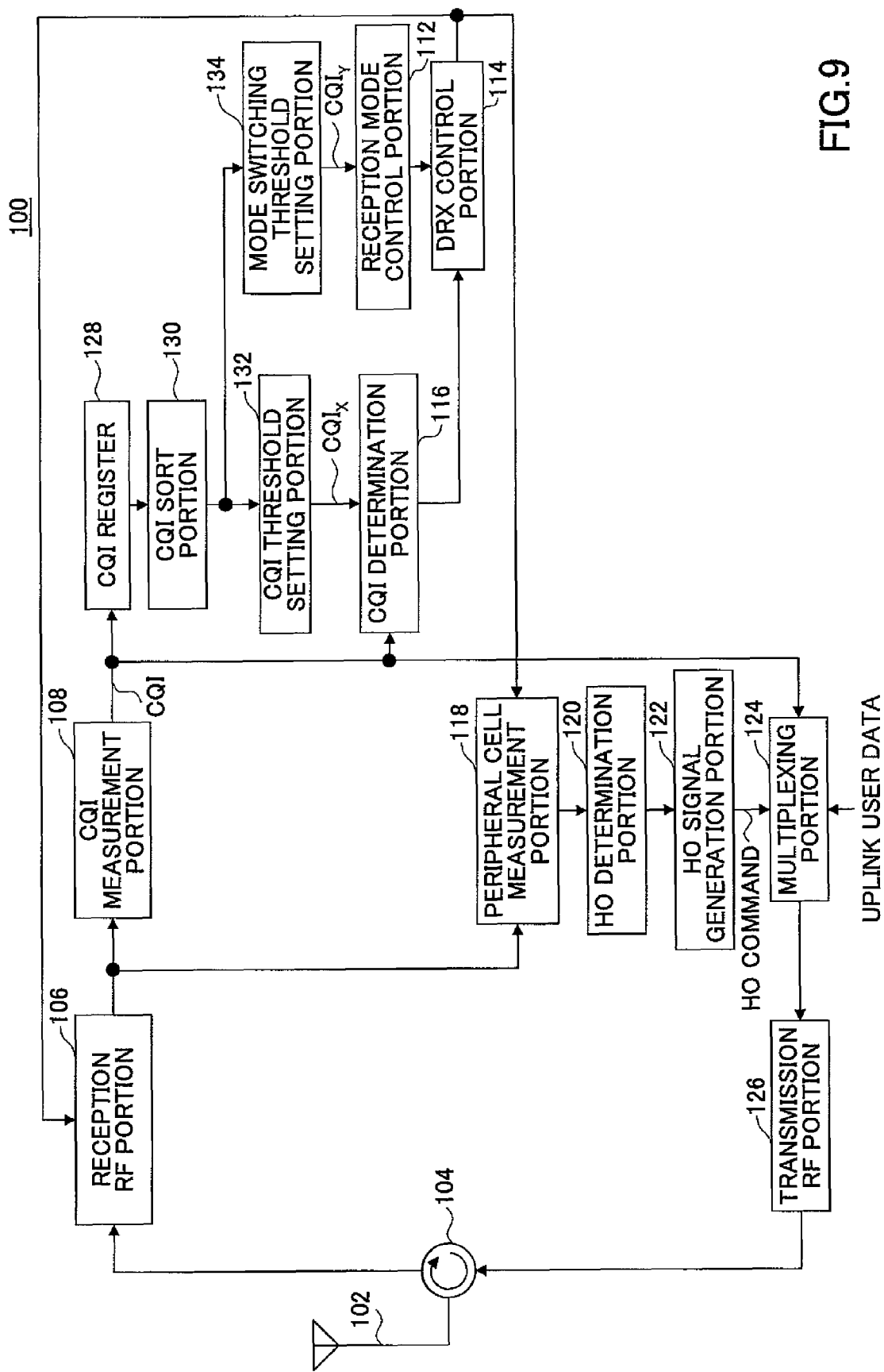
FIG. 9 is a partial block diagram illustrating a mobile station according to an example of the present invention.

Next, a mobile station 100 according to this example is described in reference to FIG. 9.

The mobile station 100 according to this example includes a CQI register 128 to which an output signal of the CQI measurement portion 108 is input, a CQI sort portion 130 to which an output signal of the CQI register 128 is input, a CQI threshold setting portion 132 to which an output signal of the CQI sort portion 130 is input, and a mode switching threshold setting portion 134 to which the output signal of the CQI sort portion 130 is input, instead of the CQI averaging portion 110 in the mobile station described in reference to FIG. 3. The CQI threshold setting portion 132 outputs the $CQI_X$ to the CQI determining portion 116. In addition, the mode switching threshold setting portion 134 outputs the $CQI_Y$ to the reception mode control portion 112.

The CQI register 128 stores the CQI. For example, the CQI register 128 is composed of a shift register, and holds the CQI value during a certain period of time (referred to as T), for example, three seconds. The CQI register 128 may discard the CQI value stored exceeding T. By the way, the CQI register 128 may change T in accordance with a traveling speed of the mobile station 100. For example, the CQI register 128 decreases T when the mobile station moves fast, and increases T when the mobile station moves slowly. Specifically, the CQI register 128 decreases T when the traveling speed of the mobile station 100 is higher than or equal to a certain threshold, and increases T when the traveling speed is lower than the certain threshold. In addition, the mobile station 100 sends information indicating the traveling speed to the base station 200.

The CQI sort portion 130 sorts the CQI values (CQI samples) stored in the CQI register 128 in ascending order (or descending order), obtains the cumulative density distribution, and outputs the obtained cumulative density distribution to the CQI threshold setting portion 132 and the mode switching threshold setting portion 134.

The CQI threshold setting portion 132 calculates the $CQI_X$ value in accordance with the cumulative density distribution input from the CQI sort portion 130, and outputs the calculated $CQI_X$ to the CQI determination portion 116. For example, the CQI threshold setting portion 132 employs interpolation such as linear interpolation to calculate the $CQI_X$ value.

The mode switching threshold setting portion 134 calculates the $CQI_Y$ value in accordance with the cumulative density distribution input from the CQI sort portion 130, and outputs the calculated $CQI_Y$ to the reception mode control portion 112. For example, the mode switching threshold setting portion 134 employs interpolation such as linear interpolation to calculate the $CQI_Y$ value.

The CQI determination portion 116 compares the instantaneous value of the CQI with the $CQI_X$, and outputs the comparison result to the DRX control portion 114.

The reception mode control portion 112 controls the reception mode, namely controls switching the measurement mode/normal mode in accordance with the $CQI_Y$. For example, the reception mode control portion 112 compares the $CQI_Y$ with a certain threshold (system parameter), and switches the reception mode to the normal mode when the $CQI_Y$ is greater than or equal to the threshold and to the measurement mode when the $CQI_Y$ is less than the threshold.

The DRX control portion 114 carries out control so as to cause the DRX to autonomously measure a different frequency and a different system in a time period when the instantaneous CQI is less than the $CQI_X$ in accordance with the comparison result of the instantaneous CQI and the $CQI_X$ during the measurement mode. In addition, the DRX control portion 114 does not carry out the DRX but enables the receiver to be attuned to the frequency and the system used in the current communications so that the receiver can receive the data in a time period when the instantaneous CQI exceeds the $CQI_X$ in accordance with the comparison result of the instantaneous CQI and the $CQI_X$ during the measurement mode.

Next, a base station 200 according to this example is described in reference to FIG. 10.

The base station 200 includes a CQI register 224 to which an output signal of the demultiplexing portion 208 is input, a CQI sort portion 226 to which an output signal of the CQI register 224 is input, a CQI threshold setting portion 228 to which an output signal of the CQI sort portion 226 is input, and a mode switching threshold setting portion 230 to which the output signal of the CQI sort portion 226 is input, instead of the CQI averaging portion 210 in the base station described in reference to FIG. 4. The CQI threshold setting portion 228 outputs the $CQI_X$ to the CQI determination portion 216. In addition, the mode switching threshold setting portion 230 outputs the $CQI_Y$ to the transmission mode control portion 212.

The CQI register 224 stores the CQI. For example, the CQI register 224 is composed of a shift register, and holds the CQI value during a certain period of time (referred to as T), for example, three seconds. The CQI register 224 may discard the CQI value stored exceeding T. By the way, the CQI register 224 may change T in accordance with the traveling speed of the mobile station 100. For example, the CQI register 224 decreases T when the mobile station 100 moves fast, and increases T when the mobile station 100 moves slowly. Specifically, the CQI register 224 decreases T when the traveling speed of the mobile station 100 is higher than or equal to a certain threshold, and increases T when the traveling speed is lower than the certain threshold. In this case, information indicating the traveling speed is sent to the base station 200 from the mobile station 100.

The CQI sort portion 226 sorts the CQI samples held at the CQI register 224 in ascending order (or descending order), obtains the cumulative density distribution, and outputs the obtained cumulative density distribution to the CQI threshold setting portion 228 and the mode switching threshold setting portion 230.

The CQI threshold setting portion 228 calculates the $CQI_X$ value in accordance with the cumulative density distribution input from the CQI sort portion 226, and the calculated $CQI_X$ to the CQI determination portion 216. For example, the CQI threshold setting portion 228 employs interpolation such as linear interpolation to calculate the $CQI_X$ value.

The mode switching threshold setting portion 230 calculates the $CQI_Y$ value in accordance with the cumulative density distribution input from the CQI sort portion 226, and outputs the calculated $CQI_Y$ to the transmission mode control portion 212. For example, the mode switching threshold setting portion 230 employs interpolation such as linear interpolation to calculate the $CQI_Y$ value.

The CQI determination portion 216 compares the instantaneous CQI with the $CQI_X$, and outputs the comparison result to the $DT_X$ control portion 214.

The transmission mode control portion 212 controls the transmission mode, namely controls switching the discontinuous transmission mode/the normal mode in accordance with the $CQI_Y$. For example, the transmission mode control portion 212 compares the $CQI_Y$ with a certain threshold, and switches the transmission mode to the normal mode when the $CQI_Y$ is greater than or equal to the certain threshold and to the discontinuous transmission mode when the $CQI_Y$ is less than the certain threshold.

The DTX control portion 214 controls the data transmission in accordance with the comparison result input from the CQI determination portion 216 when the information indicating the transmission mode, which is input from the transmission mode control portion 212, shows the discontinuous transmission mode. For example, the DTX control portion 214 determines that the mobile station 100 is carrying out the DRX when the instantaneous CQI is less than the $CQI_Y$ in the case of the discontinuous transmission mode, and carries out the DTX control to stop transmitting the downlink signal to the mobile station 100 concerned. In addition, the DTX control portion 214 continues the communications when the instantaneous CQI is greater than the $CQI_Y$ in the case of the discontinuous transmission mode. The DTX control portion 214 outputs information indicating the DTX control status to the transmission signal generation portion 218.

Next, operations of the mobile station 100 according to this example are described in reference to FIG. 11.

The CQI measurement portion 108 measures a radio channel condition (CQI) from a reception signal, for example, a common pilot channel from the cell where the current communications are carried out (step S1102).

Next, the CQI register 128 stores the CQI value for a predetermined period of time (step S1104).

Next, the CQI sort portion 130 obtains a cumulative density distribution in accordance with the CQI samples held at the CQI register 128 (step S1106).

Next, the CQI threshold setting portion 132 calculates the $CQI_X$ value in accordance with the cumulative density distribution, and the mode switching threshold setting portion 134 calculates the $CQI_Y$ value in accordance with the cumulative density distribution (step S1108).

Next, the reception mode control portion 112 compares the $CQI_Y$ with a threshold (step S1110).

When the $CQI_Y$ is not less than or equal to the threshold, namely, $CQI_Y \leq$ threshold is not the case (step S1110: NO), the reception mode control portion 112 sets the communications mode (step S1112). Then, this procedure returns to step S1102.

On the other hand, in the case of $CQI_Y \leq$ threshold (step S1110: YES), the reception mode control portion 112 sets the measurement mode (step S1114).

Next, the CQI determination portion 116 compares the instantaneous value of the CQI (the instantaneous CQI) with the $CQI_X$ (step S1116).

When the instantaneous CQI is less than or equal to the $CQI_X$, namely, in the case of the instantaneous $CQI \leq$ the $CQI_X$ (step S1116: YES), the DRX control portion 114 carries out the DRX and controls so as to measure a different frequency and a different system (step S1118. Then, the procedure returns to step S1102.

On the other hand, when the instantaneous $CQI \leq$ the $CQI_X$ is not the case (step S1116: NO), the DRX control portion 114 controls so as to continue the communications (step S1120). Then, the procedure returns to step S1102.

Under ideal operations, switching the normal mode/measurement mode and the timings of the DRX and the DTX are completely synchronized between the mobile station and the base station.

This international patent application is based on Japanese Priority Applications Nos. 2005-379988 and 2006-059636, filed on Dec. 28, 2005 and Mar. 6, 2006, respectively, with the Japanese Patent Office, the entire contents of which are hereby incorporated herein by reference.

INDUSTRIAL APPLICABILITY

A mobile station, a base station, and a peripheral cell measurement control method are applicable to a radio communications system.

The invention claimed is:

1. A mobile station comprising:
a radio channel condition measurement portion configured to measure a radio channel condition;
a sort portion configured to obtain a cumulative density distribution of the measured radio channel condition;
a first statistical amount calculation portion configured to calculate a first statistical amount to switch to a measurement mode for measuring a different system based on the cumulative density distribution; and
a reception mode control portion configured to compare the first statistical amount with a predetermined threshold and switch to the measurement mode if the first statistical amount is less than or equal to the threshold.

2. The mobile station of claim 1, further comprising:
a second statistical amount calculation portion configured to, upon switching to the measurement mode, calculate a second statistical amount to switch to a discontinuous reception mode for measuring a different system in a discontinuous reception based on the cumulative density distribution; and
a discontinuous reception control portion configured to, upon switching to the measurement mode, control to measure the different system in the discontinuous reception mode based on a comparison between the second statistical amount and the radio channel condition.

3. The mobile station of claim 2, wherein the discontinuous reception portion controls to measure the different system in the discontinuous reception if the radio channel condition is less than or equal to the second statistical amount.

4. A base station for communicating to a mobile station wherein the mobile station includes a radio channel condition measurement portion configured to measure a radio channel condition; a sort portion configured to obtain a cumulative density distribution of the measured radio channel condition; a first statistical amount calculation portion configured to calculate a first statistical amount to switch to a measurement mode for measuring a different system based on the cumulative density distribution; and a reception mode control portion configured to compare the first statistical amount with a predetermined threshold and switch to the measurement mode if the first statistical amount is less than or equal to the threshold, comprising:
a sort portion configured to obtain a cumulative density distribution of a radio channel condition received from the mobile station;
a first statistical amount calculation portion configured to calculate a first statistical amount to switch to a discontinuous transmission mode based on the cumulative density distribution; and
a transmission mode control portion configured to compare the first statistical amount with a predetermined threshold and switch to the discontinuous transmission mode if the first statistical amount is less than or equal to the threshold.

5. The base station of claim 4, further comprising:
a second statistical amount calculation portion configured to, upon switching to the discontinuous transmission mode, calculate a second statistical amount to stop transmitting a downlink signal to the mobile station based on the cumulative density distribution; and
a discontinuous transmission control portion configured to, upon switching to the discontinuous transmission mode, control to stop transmitting the downlink signal to the mobile station based on a comparison between the second statistical amount and the radio channel condition.

6. The base station of claim 5, wherein the discontinuous transmission control portion controls to stop transmitting the downlink signal to the mobile station if the radio channel condition is less than or equal to the second statistical amount.

7. A peripheral cell measurement method comprising:
receiving a common pilot channel transmitted from a base station covering a camped cell;
measuring a radio channel condition from the common pilot channel;
obtaining a cumulative density distribution of the measured radio channel condition;
calculating a first statistical amount to switch to a measurement mode for measuring a different system based on the cumulative density distribution; and
comparing the first statistical amount with a predetermined threshold and switching to the measurement mode if the first statistical amount is less than or equal to the threshold.

8. The peripheral cell measurement method of claim 7, further comprising:
upon switching to the measurement mode,
calculating a second statistical amount to switch to a discontinuous reception mode for measuring a different system in a discontinuous reception based on the cumulative density distribution; and
controlling to measure the different system in the discontinuous reception based on a comparison between the second statistical amount and the radio channel condition.

9. The peripheral cell measurement method of claim 8, wherein the controlling comprises controlling to measure the different system in the discontinuous reception if the radio channel condition is less than or equal to the second statistical amount.

* * * * *